(12) United States Patent
Gianchandani et al.

(10) Patent No.: US 7,456,698 B2
(45) Date of Patent: Nov. 25, 2008

(54) MECHANICAL SELF-RECIPROCATING OSCILLATOR AND MECHANISM AND A METHOD FOR ESTABLISHING AND MAINTAINING REGULAR BACK AND FORTH MOVEMENT OF A MICROMACHINED DEVICE WITHOUT THE AID OF ANY ELECTRONIC COMPONENTS

(75) Inventors: Yogesh B. Gianchandani, Ann Arbor, MI (US); Kabir Udeshi, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 725 days.

(21) Appl. No.: 11/038,873

(22) Filed: Jan. 20, 2005

(65) Prior Publication Data

US 2005/0168101 A1 Aug. 4, 2005

Related U.S. Application Data

(60) Provisional application No. 60/538,256, filed on Jan. 22, 2004.

(51) Int. Cl.
*H02N 10/00* (2006.01)
*H02N 1/00* (2006.01)
*G01B 7/34* (2006.01)
*H03B 5/30* (2006.01)

(52) U.S. Cl. ............... 331/154; 333/186; 310/306; 310/309; 60/527; 73/105; 355/78

(58) Field of Classification Search ........... 331/154; 310/309, 306; 333/186; 73/105; 335/78; 60/527

See application file for complete search history.

(56) References Cited

U.S. PATENT DOCUMENTS 5,914,553 A * 6/1999 Adams et al. ............... 310/309
6,594,994 B2 7/2003 Gianchandani et al.

OTHER PUBLICATIONS

Tang, W., et al., Electrostatic Comb-Drive of Lateral Polysilicon Resonators, Sensors and Actuators A (Physical), v A21, n 1-3, Feb. 1990, pp. 328-331.
Zeng, S., et al., Fabrication and Characterization of Electrokinetic Micro Pumps, Thermomechanical Phenomena in Electronic System, v 2, 2000, pp. 31-36.
Wilson, C., et al., Spectral Detection of Metal Contaminants in Water Using an On-Chip Microglow Discharge, IEEE Trans. Electron Devices, v 49, n 12, Dec. 2002, pp. 2317-2322.

(Continued)

*Primary Examiner*—Joseph Chang
(74) *Attorney, Agent, or Firm*—Brooks Kushman P.C.

(57) ABSTRACT

A mechanical self-reciprocating oscillator and mechanism and method for establishing and maintaining regular back and forth movement of a micromachined device without the aid of any electronic components are provided. The fully mechanical micromachined oscillator and mechanism are driven using only a DC power source on at least one substrate such as a semiconductor chip. The oscillator and mechanism preferably include an electrothermal actuator, that, when actuated, opens a switch to cut off supply current to the actuator. Two versions of the oscillator and mechanism are provided using distinct hysteresis mechanisms, one structural and the other thermal.

43 Claims, 3 Drawing Sheets

OTHER PUBLICATIONS

Lee, J., et al., A Miniaturized High-Voltage Solar Cell Array as an Electrostatic MEMS Power Supply, J. MEMS, v 4, Sep. 1995, pp. 102-108.

Bates, J., et al., Rechargeable Solid State Lithium Microbatteries, IEEE MEMS, 1993, pp. 82-86.

Jiang, H., et al., On-Chip Integration of High-Voltage Generator Circuits for an Electrostatic Micromotor, Intl. Conf. on Solid-State Sensors and Actuators, v 1, 1995, pp. 150-153.

Ahn, C., et al., A Comparison of Two Micromachined Inductors (Bar and Meander-Type) for Fully Integrated Boost DC/DC Power Converters, IEEE Transactions on Power Electronics, v 11, n 2, Mar. 1996, pp. 239-245.

Skidmore, G., et al., Assembly Technology Across Multiple Length Scales From the Micro-Scale to the Nano-Scale, IEEE MEMS, 2004, pp. 588-592.

Armagnat, H., The Theory, Design and Construction of Induction Coils, New York, McGraw Publishing Company, 1908.

Jaeger, R., Microelectronic Circuit Design, McGraw-Hill, 1997.

Udeshi, K., et al., A DC-Powered, Tunable, Fully Mechanical Oscillator Using In-Plane Electrothermal Actuation, IEEE MEMS, 2004, pp. 502-506.

Mohan, N., et al., Power Electronics: Converters, Applications, and Design, New York, John Wiley & Sons, Inc., 1995.

Flanagan, W., Handbook of Transformer Design and Applications, McGraw-Hill, Inc., 1993.

Lorents, H., et al., SU-8: A Low Cost Negative Resist for MEMS, J. Micromech. Microeng., v 7, n 3, 1997, pp. 121-124.

Stewart, J., et al., Theory and Design of Capacitor-Storage Ignition Systems, Technical Report, University of Michigan, Ann Arbor, 1956.

Burns, D., et al., Sealed-Cavity Resonant Microbeam Pressure Sensor, Sensors and Actuators, A: Physical, v 48, n 3, May 30, 1995, pp. 179-186.

Roessig, T., et al., Surface-Micromachined Resonant Accelerometer, International Conference on Solid-State Sensors & Actuators, Proc., v 2, 1997, pp. 859-862.

Putty, M., et al., A Micromachined Vibrating Ring Gyroscope, Solid-State Sensor & Act. Workshop, 1994, pp. 213-220.

Nguyen, C., High-Q Micromechanical Oscillators and Filters for Communications, 1997 IEEE International Symposium on Circuits and Systems, 1997, pp. 2825-2828.

Dec, A., et al., Microwave MEMS-Based Voltage-Controlled Oscillators, IEEE Transactions on Microwave Theory and Techniques, v 48, n 11, Nov. 2000, pp. 1943-1949.

Que, L., et al., Bent-Beam Electro-Thermal Actuators for High Force Applications, IEEE International MEMS, 1999, pp. 31-36.

Jensen, B., et al., Design Optimization of a Fully-Compliant Bistable Micro-Mechanism, ASME International Mechanical Engineering Congress and Exposition, 2001, pp. 357-363.

Chu, L., Feedback Controllable ID and 2D Micro Positioners Using Electrothermal Actuators and Capacitive Displacement Sensors, Ph.D. Dissertation, Univ. of Wisconsin-Madison, 2003.

Lorents, H., et al., SU-8: A Low-Cost Negative Resist for MEMS, J. Micromech. Microeng. 7, 1997, pp. 121-124.

Park, J., et al., Long Throw and Rotary Output Electro-Thermal Actuators Based on Bent-Beam Suspensions, Proceedings of the IEEE Micro Electro Mechanical Systems (MEMS), 2000, pp. 680-685.

* cited by examiner

MECHANICAL SELF-RECIPROCATING OSCILLATOR AND MECHANISM AND A METHOD FOR ESTABLISHING AND MAINTAINING REGULAR BACK AND FORTH MOVEMENT OF A MICROMACHINED DEVICE WITHOUT THE AID OF ANY ELECTRONIC COMPONENTS

CROSS-REFERENCE TO RELATED APPLICATION

This application claims the benefit of U.S. provisional application Ser. No. 60/538,256, filed Jan. 22, 2004 and entitled "Microelectromechanical High Voltage Generator."

STATEMENT REGARDING FEDERALLY SPONSORED RESEARCH OR DEVELOPMENT

This invention was made with Government support from the National Science Foundation under Contract No. EEC-9986866. The Government has certain rights in the invention.

BACKGROUND OF THE INVENTION

1. Field of the Invention

This invention relates to mechanical self-reciprocating oscillators and mechanisms and methods for establishing and maintaining regular back and forth movement of a micromachined device without the aid of any electronic components.

2. Background Art

The following are related to the invention and may be referenced herein:

[1] W. Tang et al., "Electrostatic Comb-Drive of Lateral Polysilicon Resonators," SENSORS AND ACTUATORS A (PHYSICAL), v A21, n 1-3, February 1990, pp. 328-31.

[2] S. Zeng et al., "Fabrication and Characterization of Electrokinetic Micro Pumps," THERMOMECHANICAL PHENOMENA IN ELECTRONIC SYSTEMS, v 2, 2000, pp. 31-36.

[3] C. Wilson et al., "Spectral Detection of Metal Contaminants in Water Using an On-Chip Microglow Discharge," IEEE TRANS. ELECTRON DEVICES, v 49, n 12, December 2002, pp. 2317-22.

[4] J. Lee et al., "A Miniaturized High-Voltage Solar Cell Array as an Electrostatic MEMS Power Supply," J. MEMS, v 4, September 1995, pp. 102-108.

[5] J. Bates et al., "Rechargeable Solid State Lithium Microbatteries," IEEE MEMS, 1993, pp. 82-86.

[6] H. Jiang et al., "On-Chip Integration of High-Voltage Generator Circuits for an Electrostatic Micromotor," INTL. CONF. ON SOLID-STATE SENSORS AND ACTUATORS, v 1, 1995, pp. 150-53.

[7] C. Ahn et al., "A Comparison of Two Micromachined Inductors (Bar and Meander-Type) for Fully Integrated Boost DC/DC Power Converters," IEEE TRANSACTIONS ON POWER ELECTRONICS, v 11, n 2, March 1996, pp. 239-45.

[8] G. Skidmore et al., "Assembly Technology Across Multiple Length Scales From the Micro-Scale to the Nano-Scale," IEEE MEMS, 2004, pp. 588-92.

[9] H. Armagnat, THE THEORY, DESIGN AND CONSTRUCTION OF INDUCTION COILS, New York, McGraw Publishing Company, 1908.

[10] R. Jaeger, MICROELECTRONIC CIRCUIT DESIGN, McGraw-Hill, 1997.

[11] K. Udeshi et al., "A DC-Powered, Tunable, Fully Mechanical Oscillator Using In-Plane Electrothermal Actuation," IEEE MEMS, 2004, pp. 502-06.

[12] N. Mohan et al., POWER ELECTRONICS: CONVERTERS, APPLICATIONS, AND DESIGN, New York, John Wiley & Sons, Inc., 1995.

[13] W. Flanagan, HANDBOOK OF TRANSFORMER DESIGN AND APPLICATIONS, McGraw-Hill, Inc., 1993.

[14] H. Lorents et al., "SU-8: A Low Cost Negative Resist for MEMS," J. MICROMECH. MICROENG, v 7, n 3, 1997, pp. 121-24.

[15] J. Stewart et al., THEORY AND DESIGN OF CAPACITOR-STORAGE IGNITION SYSTEMS, Technical Report, University of Michigan, Ann Arbor, 1956.

A large number of micromachined devices ranging from electrostatic actuators [1], to microfluidic electrokinetic pumps [2], to microplasmas [3], all need high voltages for their operation. This requirement for high voltages is what prevents the use of these devices in integrated Microsystems and portable devices as they can only be powered by a single low-voltage DC supply. The need for high voltage generators extends to automotive transducers and a variety of portable electronic devices that use LCD display technology. In order to meet this demand, schemes have been proposed to integrate an additional miniaturized high voltage power source [4,5]. These, however, occupy large footprints and entail the additional overhead of power management and distribution. The preferred solution is to step up voltage from the low voltage DC power source such as a battery. A typical implementation of such a high voltage generator utilizes an inductor in conjunction with a switch that periodically breaks the current through the inductor. The miniaturization and integration of this high voltage generator has been limited by the need for an efficient inductive element as well as a high power, high voltage switch.

Traditionally, microelectronic transistors have been used as switches for high voltage generators. However, in standard CMOS technology transistors are severely limited by their dielectric and junction breakdown voltages, making them unsuitable for any application that demands even moderately high voltage or power levels [6]. The use of hybrid high voltage CMOS technology results in increased costs, and yet can handle only voltages up to about 80 V. In addition to the voltage limitation, transistors need electrical control signals that determine their switching characteristics. These control signals are generally obtained from an oscillator. The inductive element may be microfabricated, but typically results in modest inductance values [7]. An alternative approach is to integrate wire wound inductors using microassembly techniques [8].

The following are also related to the invention and may be referenced herein:

[A] D. Burns et al., "Sealed-Cavity Resonant Microbeam Pressure Sensor," SENSORS AND ACTUATORS, A: PHYSICAL, v 48, n 3, May 30, 1995, pp. 179-86.

[B] T. Roessig et al., "Surface-Micromachined Resonant Accelerometer," INTERNATIONAL CONFERENCE ON SOLID-STATE SENSORS & ACTUATORS, PROC., v 2, 1997, pp. 859-62.

[C] M. Putty et al., "A Micromachined Vibrating Ring Gyroscope," SOLID-STATE SENSOR & ACT. WORKSHOP, 1994, pp. 213-20.

[D] C. Nguyen, "High-Q Micromechanical Oscillators and Filters for Communications," 1997 IEEE INTERNATIONAL SYMPOSIUM ON CIRCUITS AND SYSTEMS, 1997, pp. 2825-28.

[E] A. Dec et al., "Microwave MEMS-Based Voltage-Controlled Oscillators," IEEE TRANSACTIONS ON MICROWAVE THEORY AND TECHNIQUES, v 48, n 11, November 2000, pp. 1943-49.

[F] L. Que et al., "Bent-Beam Electro-Thermal Actuators for High Force Applications," IEEE INTERNATIONAL MEMS, 1999, pp. 31-36.

[G] B. Jensen et al., "Design Optimization of a Fully-Compliant Bistable Micro-Mechanism," ASME INTERNATIONAL MECHANICAL ENGINEERING CONGRESS AND EXPOSITION, 2001, pp. 357-63.

[H] L. Chu, FEEDBACK CONTROLLABLE 1D AND 2D MICRO POSITIONERS USING ELECTROTHERMAL ACTUATORS AND CAPACITIVE DISPLACEMENT SENSORS, Ph.D. Dissertation, Univ. of Wisconsin-Madison, 2003.

[I] H. Lorents et al., "SU-8: A Low-Cost Negative Resist for MEMS," J. MICROMECH. MICROENG. 7, 1997, pp. 121-24.

[J] J. Park et al., "Long Throw and Rotary Output Electro-Thermal Actuators Based on Bent-Beam Suspensions," PROCEEDINGS OF THE IEEE MICRO ELECTRO MECHANICAL SYSTEMS (MEMS), 2000, PP. 680-85.

Oscillators generate a modulating signal from a DC power source and are used in all applications that require periodic excitation. A wide spectrum of micromachined devices ranging from strain and pressure sensors [A] to accelerometers and gyroscopes [B,C] either require or exhibit improved performance when driven by a modulating signal.

On-chip signal generators reported in the past needed electronic components for their operation. The implementation of these oscillators using standard microelectronic circuits severely limits their voltage and power handling capacity and makes them unsuitable for direct use in any application demanding even moderately high voltages or power levels. Even oscillators that have utilized MEMS components have all used electronics to provide feedback of an amplified signal. Micromachined mass-spring systems have been used to replace LC tank circuits to provide frequency selective feedback [D]. In other cases, MEMS-based variable capacitors have been used to make voltage controlled tunable oscillators [E].

U.S. Pat. No. 6,594,994 discloses a micromechanical electrothermal actuator formed on a substrate.

SUMMARY OF THE INVENTION

An object of the present invention is to provide a mechanical self-reciprocating oscillator and mechanism and method for establishing and maintaining regular back and forth movement of a micromachined device without the aid of any electronic components.

In carrying out the above object and other objects of the present invention, a mechanical self-reciprocating oscillator is provided. The oscillator includes a micromachined device, and a micromachined drive actuator mechanically coupled to the device and powered by a DC power source to establish and maintain regular back and forth movement of the device between first and second positions without the aid of any electronic components.

The device may includes a micromachined switch having open and closed positions. In the closed position, current flows through the switch to actuate the actuator to move the switch to the open position in which the switch interrupts the flow of current to the actuator.

The drive actuator may include an electrothermal actuator.

The switch and the drive actuator may be electrically conductive.

The oscillator may includes a hysteresis mechanism to control duration of time that the device moves back and forth.

The mechanism may include a bistable toggle mechanism coupled to the drive actuator, and the oscillator may cycle between initial and deflected states.

The oscillator may further include a spring for biasing the switch closed in an initial state.

The drive actuator may include an electrothermal actuator having heating and cooling time constants, and the hysteresis mechanism may operate based on duration of the time constants.

The oscillator may further include a micromechanical priming actuator for driving the switch into the closed position.

The priming actuator may include an electrothermal actuator.

The oscillator may further include a latch for holding the switch in the closed position. The closed position may be a normally closed position.

The oscillator may further include a spring for biasing the switch against the latch.

The switch may include a pair of electrically conductive contact plates.

The oscillator may be a planar structure.

The actuator may be a bent-beam actuator.

The oscillator may serve as an element within an electrical relay.

The relay may be connected to electrical elements which provide voltage conversion.

Voltage conversion may be accomplished by the use of a circuit or circuit element having an inductance.

The circuit or circuit element may include an inductor or a transformer connected in series with the relay.

The conversion may be a DC-to-DC conversion, and the conversion may be obtained using peripheral electrical components.

Further in carrying out the above object and other objects of the present invention, a mechanical self-reciprocating mechanism is provided. The mechanism includes a micromachined device including a switch having an open position and a normally closed position. A micromachined drive actuator is mechanically coupled to the device and powered by an electrical power source to establish and maintain regular back and forth movement of the device between first and second positions so that the switch moves between the open and closed positions, respectively, without the aid of any electronic components.

In the closed position, current may flow through the switch to actuate the actuator to move the switch to the open position in which the switch interrupts the flow of current to the actuator.

The drive actuator may include an electrothermal actuator.

The switch and the drive actuator may be electrically conductive.

The mechanism may include a hysteresis mechanism to control duration of time that the switch is in the open and closed positions.

The hysteresis mechanism may include a bistable toggle mechanism coupled to the drive actuator. The self-reciprocating mechanism may cycle between initial and deflected states corresponding to the closed and open positions of the switch, respectively.

The self-reciprocating mechanism may further include a spring for biasing the switch closed in the initial state.

The drive actuator may include an electrothermal actuator having heating and cooling time constants. The hysteresis mechanism may operate based on duration of the time constants.

The self-reciprocating mechanism may further include a micromechanical priming actuator for driving the switch into the normally closed position.

The priming actuator may include an electrothermal actuator.

The self-reciprocating mechanism may further include a latch for holding the switch in the normally closed position.

The self-reciprocating mechanism may further include a pawl and ratchet locking mechanism for holding the switch in the normally closed position.

The locking mechanism may include gear teeth and cantilever beams.

The self-reciprocating mechanism may further include a spring for biasing the switch against the latch.

The switch may include a pair of electrically conductive contact plates.

The self-reciprocating mechanism may be a planar structure.

The self-reciprocating mechanism may serve as an element within an electrical relay.

The relay may be connected to electrical elements which provide voltage conversion.

Voltage conversion may be accomplished by the use of a circuit or circuit element having an inductance.

The circuit or circuit element may include an inductor or a transformer connected in series with the relay.

The conversion may be a DC-to-DC conversion, and the conversion may be obtained using peripheral electrical components.

The actuator may be a bent-beam actuator.

Still further in carrying out the above object and other objects of the present invention, a method for establishing and maintaining regular back and forth movement of a micromachined device between first and second positions on at least one substrate from a source of DC electrical energy is provided. The method includes: generating a flow of electrical current at an input node on the at least one substrate from the source of DC electrical energy; and converting electrical energy of the electrical current into kinetic and potential energy which establish and maintain regular back and forth movement of the device between first and second positions on the at least one substrate without the aid of any electronic components.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3c is an enlarged view of part of the flexural bistable element or toggle contained within the circled portion of FIG. 3a;

FIG. 4 is a graph showing the FEA local displacement response of the bistable toggle element of the oscillator;

DETAILED DESCRIPTION OF THE PREFERRED EMBODIMENTS

A mechanical self-reciprocating oscillator and mechanism and method for establishing and maintaining regular back and forth movement of a micromachined device without the aid of any electronic components are described herein. The oscillator and mechanism may operate within a fully mechanical self-oscillating relay and with an assembled wire wound inductive element. The oscillator and mechanism operate from a single DC power source. The operation of a high voltage generator utilizing the oscillator or mechanism has been implemented in two configurations. Experimental results show that the resulting microsystem can generate peak voltages in excess of 200 V.

Figure 1:
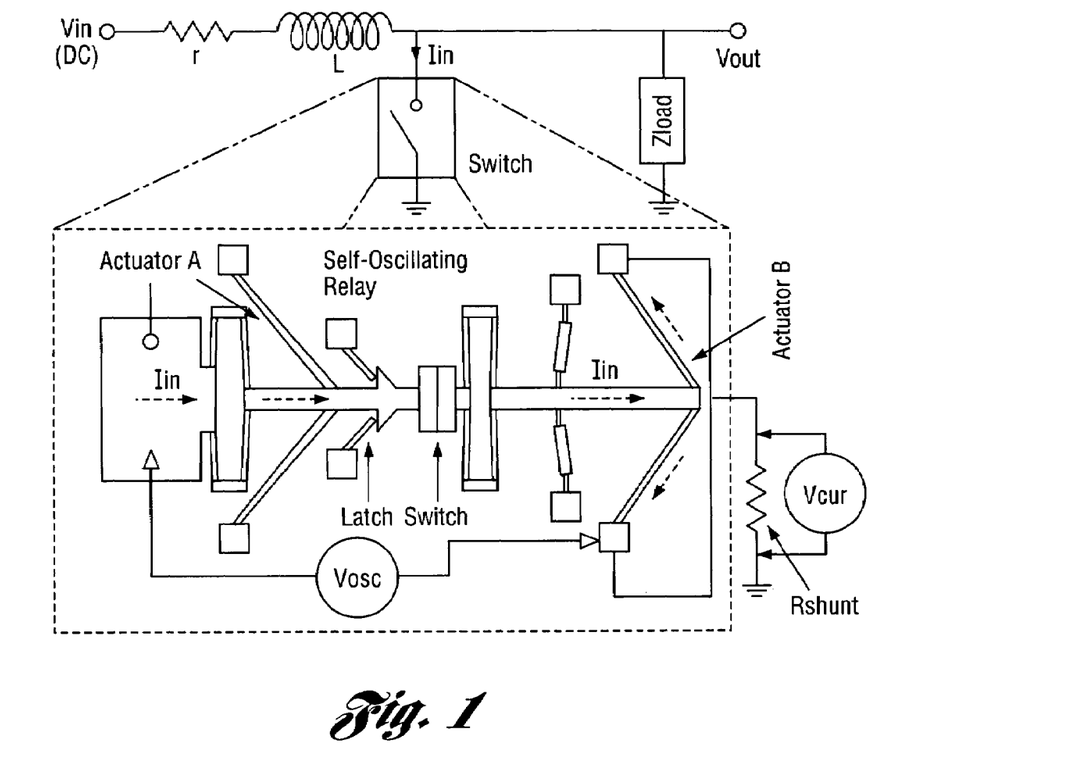
FIG. 1 is a circuit schematic of one embodiment of the invention including a schematic view of a self-oscillating relay.

The high voltage generator works on the principle of an induction coil voltage converter [9]. One embodiment of the microsystem, Version I, is similar to a boost converter [10] (FIG. 1). The current through an inductor is cut periodically by the action of a switch. In the portion of the operating cycle that the switch is closed, the input current, Iin, is on, and energy is stored in the inductor. Once the current is turned off by the switch, the stored magnetic energy is converted into electric potential, which results in the generation of a high output voltage spike, Vout, across the load impedance, Zload. The cycling of the switch between its open and closed positions results in these high voltage spikes being generated at regular intervals. The pulsed output could directly power a variety of devices or be converted to a high voltage DC. The periodic switching in the circuit is achieved by using the self-oscillating relay [11]. The relay, operated by an electrothermal actuator, is connected directly in the current path of the circuit and requires no additional electrical connections.

Figure 2:
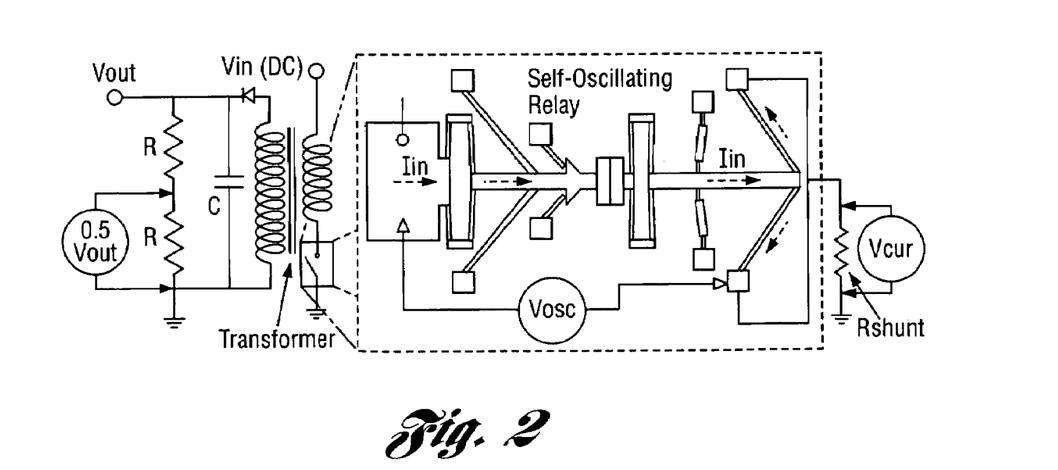
FIG. 2 is a circuit schematic of a second embodiment of the invention with the self-oscillating relay of FIG. 1.

An alternative embodiment, Version II, uses a miniature transformer in a manner similar to a flyback converter [12] (FIG. 2). The use of a transformer instead of an inductive coil provides electrical isolation as well as allows for the capability to generate higher output voltages by choosing a suitable turns-ratio.

The oscillator or mechanism of the first two embodiments is a fully mechanical micromachined oscillator that can be operated using a single DC power source, without the aid of any electronic components. This is the first implementation of a micro-scale mechanical oscillator. The oscillator has been implemented in two configurations, each of which occupy less than 1 mm$^2$ on a substrate.

The oscillator preferably includes an electrothermal actuator [F], that when actuated, opens a normally closed switch, thereby cutting its own supply current. Subsequent cooling of the actuator results in the closure of the switch and causes the cycle to repeat, resulting in oscillations. In order to keep the switch open or closed for a controllable duration of time, hysteresis is present in the system. The hysteresis allows the system to remain in unstable equilibrium for a predefined amount of time. The oscillator has been implemented in two embodiments, Type I and Type II, using the different hysteresis mechanisms.

Figure 3A:
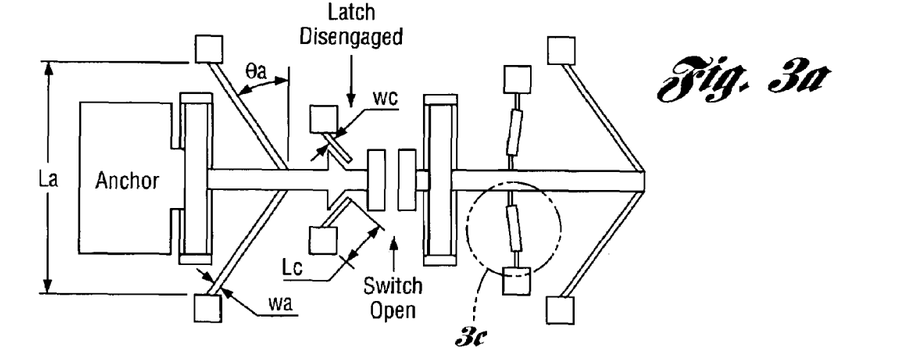
FIG. 3a is a schematic view of the fully mechanical oscillator or mechanism as fabricated.
Figure 3B:
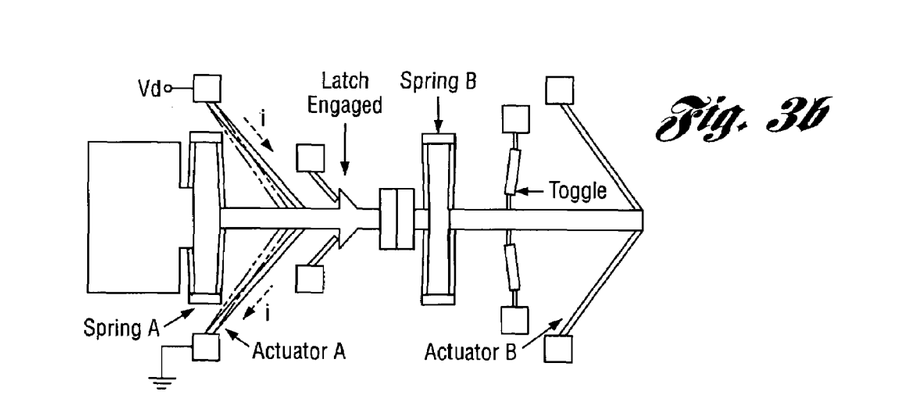
FIG. 3b is a schematic view of the oscillator of FIG. 3a after priming by a priming actuator A.

Before the oscillator can be operated, it must be primed once to make a normally closed switch as the switch is fabricated with its contact plates apart. FIGS. 3a and 3b show the priming operation. Electrothermal actuator A (FIGS. 3a and 3b) is used to push the switch into a closed position and compresses spring B. Once the switch is in the closed position, a latch is automatically engaged, clamping the switch closed permanently.

Figures 3C, 4:
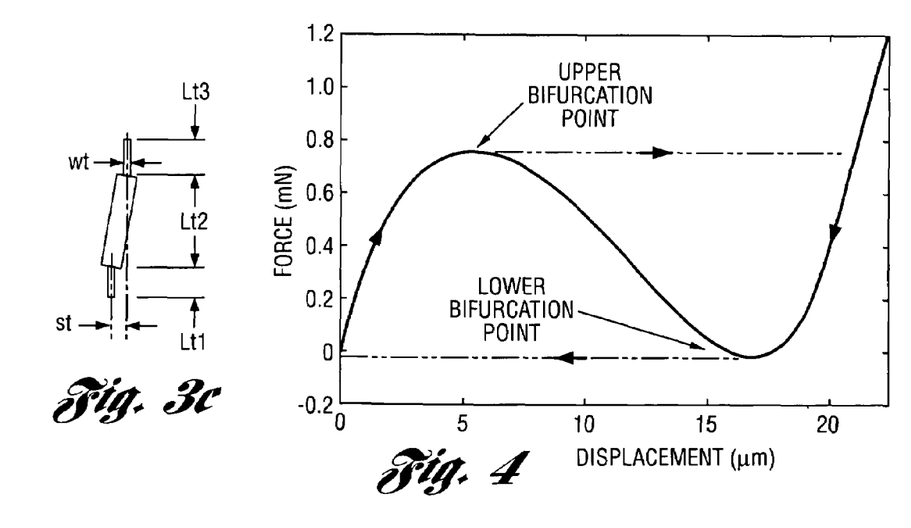
Figure 5A:
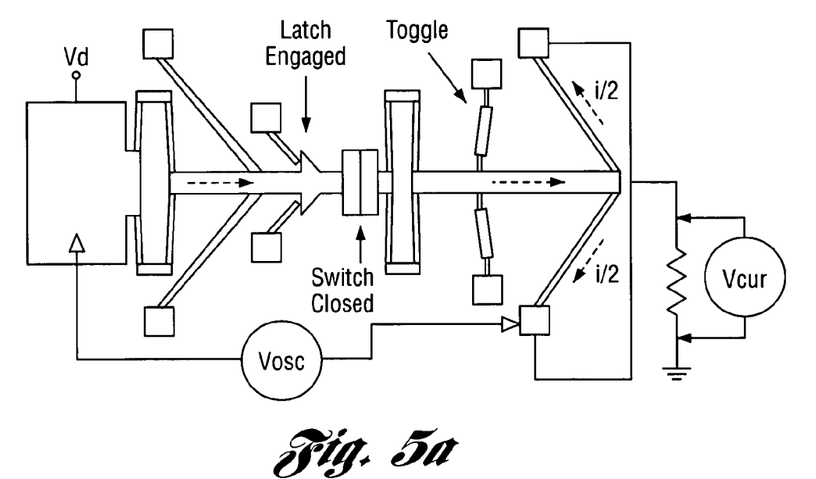
FIG. 5a is a schematic view of the oscillator during operation wherein the switch is closed and current flows in an initial state.
Figure 5B:
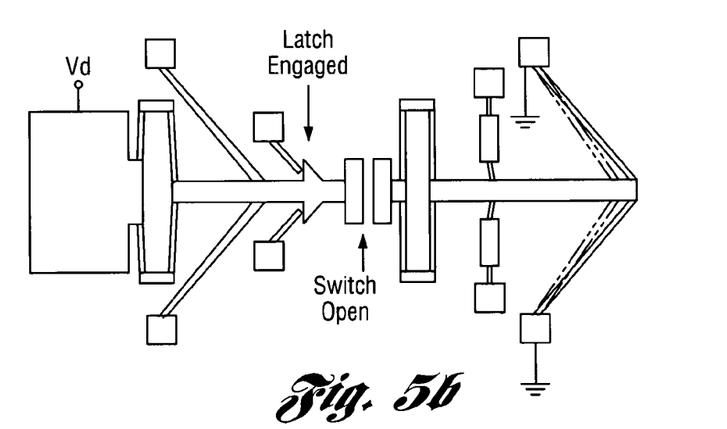
FIG. 5b is a schematic view of the oscillator during operation wherein the switch is open and the flow of current is interrupted in a deflected state.

In the Type I device, hysteresis is incorporated using a bistable toggle mechanism [G]. If the force applied on the toggle is gradually increased, the structure snaps from its original mode to a snapped mode at the upper bifurcation point, which is observed as a sudden increased in displacement (FIG. 4). A similar sudden decrease in displacement is observed at the lower bifurcation point if the applied force is quasi-statically decreased. When deployed, the oscillator cycles between the two states as shown in FIGS. 5a and 5b. In the initial state, the switch is closed and the thermal actuator is undeflected. When the supply voltage is turned on, current flows through the switch, heats up the thermal actuator and applies an increasing force on the toggle. Once the actuation force exceeds the force corresponding to the upper bifurcation point of the toggle, the device snaps through, generating a large displacement, opening the switch and cutting the current to the actuator. The device is now in its deflected state. Since no power is supplied to the actuator, it cools down due to heat dissipation to the substrate, decreasing the force applied on the toggle. The toggle snaps back to its original position when the applied force falls below that of the lower bifurcation point, closing the switch and restoring the current to the actuator. The device thus returns to its initial state, permitting the cycle to be repeated.

In the Type II oscillator, the function of the bistable element is carried out by the intrinsic thermal hysteresis of actuator B, which is caused by the duration of heating and cooling time constants of an electrothermal actuator. A higher frequency of oscillation can be obtained using thermal hysteresis, due to the smaller hysteresis loop. In this version of the device, spring B is eliminated.

The elements designed for the oscillator may include the latch mechanism for the normally closed switch, the bistable toggle mechanism, spring elements, and electrothermal actuators.

The concept of the latch is derived from that of a pawl and ratchet mechanism, which permits rotational motion only in one direction. In this case, linear motion is permitted only in one direction. The pawl is made from a cantilever beam whose axis of deflection is at an angle $\theta_c$ to the direction of motion of the ratchet. By carrying out a free body analysis, it may be proved that the stiffness of the pawl while being pushed in the forward direction of motion of actuator A, is $Cos^2(\theta_c)$ times the stiffness in the reverse direction of motion. Thus, if actuator A is displaced far enough so that the pawl can click into position behind the ratchet tooth, the assembly is latched. The latch was designed so that once engaged, it limits the reverse motion of the ratchet to 2 μm, hence creating a normally closed switch with a compressive force on the contact plates.

The design of the bistable mechanism is carried out using FEA. FIG. 4 shows the force displacement response of the bistable toggle mechanism obtained from a nonlinear analysis of the structure using two dimensional beam elements considering large displacements. Actuators A and B were designed so that they would provide sufficient forces using DC excitation to overcome the opposing force exerted by the latching mechanism and toggle, respectively. The force-displacement characteristics of the actuators were obtained using the following to get maximum displacement and force (Dmax, Fmax) assuming a uniform increase in temperature ($\Delta T$) of 600° C. [H].

$$D\max = \frac{\alpha \cdot \Delta T \cdot \sin\Phi a \cdot \left(\frac{A}{6 \cdot La} - \frac{8 \cdot I}{La^3}\right)}{\frac{16 \cdot I}{La^3} \cdot \cos\Phi a + \frac{A}{3 \cdot La} \cdot \sin\Phi a \cdot \cos\Phi a}; \quad (1)$$

$$\frac{F\max}{D\max} = \frac{2 \cdot \sin^2\Phi a \cdot A \cdot E}{La}$$

where La and $\Phi a$ are actuator dimensions as shown in FIG. 3c, I is the moment of inertia, A the cross-sectional area of the actuator and E the Young's modulus of the actuator material.

The oscillator was fabricated using a single mask UV-LIGA process using SU-8 resist [I]. Thirty micron thick structures were fabricated from electroplated copper with a minimum feature size of 3 μm. Table 1 lists the dimensions of the fabricated device as marked in FIG. 3c.

TABLE 1

| \multicolumn{4}{c}{Device Dimensions} | | | |
|---|---|---|---|
| Dimension | Value (μm) | Dimension | Value (μm) |
| La | 1000 | Lt1 | 50 |
| wa | 3 | Lt2 | 150 |
| Φa (degrees) | 3 | Lt3 | 15 |
| Lc | 100 | wt | 3 |
| wc | 3 | st | 10 |

Circuit Analysis

Both embodiments of a high voltage generator may be analyzed using the circuit in FIG. 1 consisting of a DC voltage source, Vin, parasitic resistance of the coil winding, r, an inductor, L, a switch, and the load impedance, Zload. The circuit has two phases of operation. In the first phase, the switch is closed and the current through the circuit ramps up resulting in energy being stored in the inductor. The differential equation that describes the change in current, Iin, with time, t, during this phase of operation and its solution is given by [9]:

$$r Iin + L\frac{d Iin}{dt} = Vin;\ Iin = \frac{Vin}{r}\left(1 - e^{\frac{-rt}{L}}\right) \quad (2)$$

The equation is derived under the assumption that when the switch is closed, no current flows through Zload, which is much larger than the parasitic resistance of the closed switch.

The circuit goes into its second phase of operation at the instant the switch starts opening. As the current falls to zero, the e.m.f. of the coil adds itself to that of the source leading to a high voltage across the output load. Since there are numerous physical phenomena occurring at this moment, including potential arcing across the switch, it is not easily described by a closed form expression. However, the output voltage generated, Vout, is known to be a function of the rate of change of current, Iout, that flows through the load during this phase of operation [9].

Figure 6:
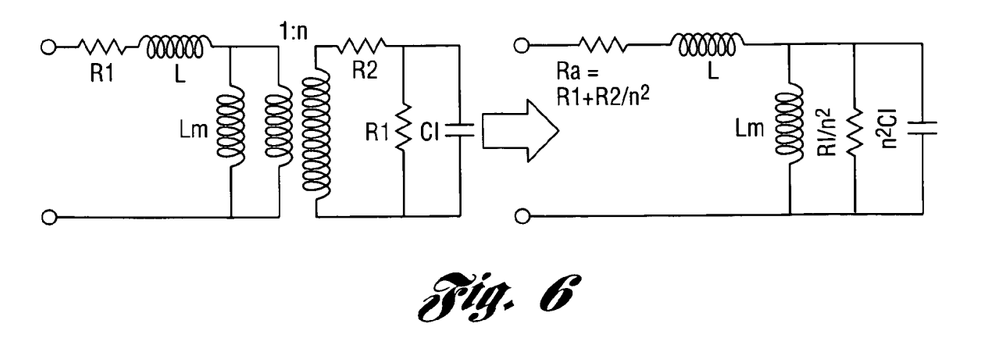
FIG. 6 is a circuit schematic model of a transformer which can be converted to an equivalent circuit with an inductor.

Version II of the high voltage generator may be analyzed in a similar manner by converting the model of a transformer into an equivalent circuit containing inductors. FIG. 6 shows the model of a transformer where R1, R2 represent the primary and secondary coil resistances, respectively, L the leakage inductance, Lm the magnetization inductance, n the turns ratio and Rl and Cl represent the load resistance and capacitance, respectively [13]. Lm corresponds to the inductance that produces magnetic flux in the transformer. The equivalent circuit eliminates the transformer and scales the load connected to the secondary circuit by a factor determined by the turns ratio. This circuit can be simulated using SPICE. The parameter that needs to be set is the rate of change of output current, which can be derived from experimental data.

The self-oscillating switch was fabricated using a single mask UV-LIGA process using SU-8 resist [14]. Thirty micron thick structures were fabricated from electroplated copper with a minimum feature size of 3 μm. The low temperature process used to fabricate the switch allows it to be appended to a CMOS process.

The coil was wound using a coil winder on a cylindrical steel core, and assembled onto a PCB along with the die of the oscillator. The microsystem has footprint of 4 mm×4 mm. The dimensions of the inductor may be significantly reduced by the use of toroidal, nickel-iron cores.

CONCLUSIONS

The high voltage generator described herein can generate high voltage spikes from a DC source without the use of transistors. Version I of this microsystem uses an inductor and has been assembled along with a self-oscillating relay to have a footprint of less than 4 mm×4 mm and can generate voltages in excess of 200 V from a 4 V DC supply. Version II uses a transformer that provides electrical isolation and allows greater control over the output voltage through the turns ratio. The system performance has been characterized under various power levels, loads and inductance values. The self-oscillating relay consumes less than 15% of the input power indicating that the system has a high energy efficiency. Results of circuit simulations, with a single fitting parameter, closely track experimental results, indicating that the system operates as predicted by theory. A reliable and optimized design of the high voltage generator reported can power high voltage sensors and allow complete integrated Microsystems to operate using a single low voltage DC power source.

Both types of mechanical oscillators described herein can generate a modulating signal from a DC source without the use of any electrical components. The type using structural hysteresis generates a signal with relatively constant frequency of about 39 Hz at different power levels, with a variable duty cycle from 0.3 to 0.6. In contrast, the oscillator using thermal hysteresis is tunable, with a frequency range from 200 to 1200 Hz and a duty cycle from 0.3 to 0.7. A supply voltage of less than 0.5 V is preferred for the oscillators, each of which has a footprint of about 1 mm×1 mm. The purely mechanical components generate oscillating signals. The use of MEMS switches allows the devices to have a high power handling capacity and can be used to drive sensors and actuators as well as make on-chip voltage converters for high voltage applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A mechanical self-reciprocating oscillator comprising:
a micromachined device; and
a micromachined drive actuator mechanically coupled to the device and powered by a DC power source to establish and maintain regular back and forth movement of the device between first and second positions wherein the oscillator includes a hysteresis mechanism to control duration of time that the device moves back and forth.

2. The oscillator as claimed in claim 1, wherein the device includes a micromachined switch having open and closed positions, wherein, in the closed position, current flows through the switch to actuate the actuator to move the switch to the open position in which the switch interrupts the flow of current to the actuator.

3. The oscillator as claimed in claim 1, wherein the drive actuator includes an electrothermal actuator.

4. The oscillator as claimed in claim 2, wherein the switch and the drive actuator are electrically conductive.

5. The oscillator as claimed in claim 1, wherein the mechanism includes a bistable toggle mechanism coupled to the drive actuator and wherein the oscillator cycles between initial and deflected states.

6. The oscillator as claimed in claim 2, further comprising a spring for biasing the switch closed in an initial state.

7. The oscillator as claimed in claim 1, wherein the drive actuator includes an electrothermal actuator having heating and cooling time constants and wherein the hysteresis mechanism operates based on duration of the time constants.

8. The oscillator as claimed in claim 2, further comprising a micromechanical priming actuator for driving the switch into the closed position.

9. The oscillator as claimed in claim 8, wherein the priming actuator includes an electrothermal actuator.

10. The oscillator as claimed in claim 8, further comprising a latch for holding the switch in the closed position wherein the closed position is a normally closed position.

11. The oscillator as claimed in claim 10, further comprising a spring for biasing the switch against the latch.

12. The oscillator as claimed in claim 2, wherein the switch includes a pair of electrically conductive contact plates.

13. The oscillator as claimed in claim 1, wherein the oscillator is a planar structure.

14. The oscillator as claimed in claim 1, wherein the actuator is a bent-beam actuator.

15. The oscillator as claimed in claim 1, wherein the oscillator serves as an element within an electrical relay.

16. The oscillator as claimed in claim 15 wherein the relay is connected to electrical elements which provide voltage conversion.

17. The oscillator as claimed in claim 16, wherein voltage conversion is accomplished by the use of a circuit or circuit element having an inductance.

18. The oscillator as claimed in claim 17, wherein the circuit or circuit element includes an inductor or a transformer connected in series with the relay.

19. The oscillator as claimed in claim 16, wherein the conversion is a DC-to-DC conversion and wherein the conversion is obtained using peripheral electrical components.

20. A mechanical self-reciprocating mechanism comprising:
a micromachined device including a switch having an open position and a normally closed position; and
a micromachined drive actuator mechanically coupled to the device and powered by an electrical power source to establish and maintain regular back and forth movement of the device between first and second positions so that the switch moves between the open and closed positions, respectively.

21. The mechanism as claimed in claim 20, wherein, in the closed position, current flows through the switch to actuate the actuator to move the switch to the open position in which the switch interrupts the flow of current to the actuator.

22. The mechanism as claimed in claim 20, wherein the drive actuator includes an electrothermal actuator.

23. The mechanism as claimed in claim 20, wherein the switch and the drive actuator are electrically conductive.

24. The mechanism as claimed in claim 20, wherein the mechanism includes a hysteresis mechanism to control duration of time that the switch is in the open and closed positions.

25. The self-reciprocating mechanism as claimed in claim 24, wherein the hysteresis mechanism includes a bistable toggle mechanism coupled to the drive actuator and wherein the self-reciprocating mechanism cycles between initial and deflected states corresponding to the closed and open positions of the switch, respectively.

26. The self-reciprocating mechanism as claimed in claim 25, further comprising a spring for biasing the switch closed in the initial state.

27. The self-reciprocating mechanism as claimed in claim 24, wherein the drive actuator includes an electrothermal actuator having heating and cooling time constants and wherein the hysteresis mechanism operates based on duration of the time constants.

28. The mechanism as claimed in claim 20, further comprising a micromechanical priming actuator for driving the switch into the normally closed position.

29. The mechanism as claimed in claim 28, wherein the priming actuator includes an electrothermal actuator.

30. The mechanism as claimed in claim 28, further comprising a latch for holding the switch in the normally closed position.

31. The mechanism as claimed in claim 28, further comprising a pawl and ratchet locking mechanism for holding the switch in the normally closed position.

32. The mechanism as claimed in claim 31, wherein the locking mechanism includes gear teeth and cantilever beams.

33. The mechanism as claimed in claim 3, further comprising a spring for biasing the switch against the latch.

34. The mechanism as claimed in claim 20, wherein the switch includes a pair of electrically conductive contact plates.

35. The mechanism as claimed in claim 20, wherein the mechanism is a planar structure.

36. The mechanism as claimed in claim 20, wherein the mechanism serves as an element within an electrical relay.

37. The mechanism as claimed in claim 36, wherein the relay is connected to electrical elements which provide voltage conversion.

38. The mechanism as claimed in claim 37, wherein voltage conversion is accomplished by the use of a circuit or circuit element having an inductance.

39. The mechanism as claimed in claim 38, wherein the circuit or circuit element includes an inductor or a transformer connected in series with the relay.

40. The mechanism as claimed in claim 37, wherein the conversion is a DC-to-DC conversion and wherein the conversion is obtained using peripheral electrical components.

41. The mechanism as claimed in claim 20, wherein the actuator is a bent-beam actuator.

42. A method for establishing and maintaining regular back and forth movement of a micromachined device between first and second positions on at least one substrate from a source of DC electrical energy, the method comprising:
  generating a flow of electrical current at an input node on the at least one substrate from the source of DC electrical energy; and
  converting electrical energy of the electrical current into kinetic and potential energy which establish and maintain regular back and forth movement of the device between first and second positions on the at least one substrate.

43. A mechanical self-reciprocating oscillator comprising:
a micromachined device; and
a micromachined drive actuator mechanically coupled to the device and powered by a DC power source to establish and maintain regular back and forth movement of the device between first and second positions wherein the drive actuator includes an electrothermal actuator.

* * * * *

UNITED STATES PATENT AND TRADEMARK OFFICE
CERTIFICATE OF CORRECTION

PATENT NO. : 7,456,698 B2  Page 1 of 1
APPLICATION NO. : 11/038873
DATED : November 25, 2008
INVENTOR(S) : Yogesh B. Gianchandani et al.

It is certified that error appears in the above-identified patent and that said Letters Patent is hereby corrected as shown below:

Column 11, Line 42, Claim 33:

Delete "3" and insert -- 31 --.

Signed and Sealed this

Twenty-fourth Day of February, 2009

JOHN DOLL
*Acting Director of the United States Patent and Trademark Office*